United States Patent [19]
Sugishima

[11] Patent Number: 5,325,908
[45] Date of Patent: Jul. 5, 1994

[54] HYDRAULICALLY OPERATED CASTING MACHINE FOR PRODUCING A FORMED PRODUCT, HAVING MOLD CLOSING AND CLAMPING CYLINDERS

[75] Inventor: Sakae Sugishima, Aichi, Japan

[73] Assignee: Toyota Jidosha Kabushiki Kaisha, Aichi, Japan

[21] Appl. No.: 999,409

[22] Filed: Dec. 31, 1992

[30] Foreign Application Priority Data

| Jan. 17, 1992 | [JP] | Japan | 4-27230 |
| Jan. 17, 1992 | [JP] | Japan | 4-27231 |
| Jan. 17, 1992 | [JP] | Japan | 4-27232 |

[51] Int. Cl.$^5$ .............................. B22D 33/04
[52] U.S. Cl. ........................ 164/341; 164/343; 164/155.1 A
[58] Field of Search ............ 164/342, 344, 343, 341, 164/339, 155

[56] References Cited

U.S. PATENT DOCUMENTS 4,269,259  5/1981  Ueno ........................... 164/343

FOREIGN PATENT DOCUMENTS

| 0311133 | 4/1989 | European Pat. Off. |  |
| 0314942 | 5/1989 | European Pat. Off. |  |
| 3-155445 | 7/1919 | Japan . |  |
| 51-71355 | 6/1976 | Japan . |  |
| 57-160563 | 10/1982 | Japan | 164/341 |
| 62-44418 | 2/1984 | Japan | 164/342 |
| 59-199225 | 11/1984 | Japan | 164/342 |
| 64-10394 | 1/1989 | Japan . |  |
| 1221208 | 9/1989 | Japan | 164/341 |
| 1222917 | 9/1989 | Japan | 164/341 |
| 3234343 | 10/1991 | Japan | 164/344 |

OTHER PUBLICATIONS

Communication dated Jun. 10, 1993 (1 page) and Search Report dated May 24, 1993 (2 pages).

*Primary Examiner*—P. Austin Bradley
*Assistant Examiner*—Rex E. Pelto
*Attorney, Agent, or Firm*—Finnegan, Henderson, Farabow, Garrett & Dunner

[57] ABSTRACT

A casting machine having a mold closing and opening cylinder for moving a movable die plate with a movable die relative to a stationary die plate having a stationary die, and a mold clamping cylinder each having a cylinder housing and a piston which partially define a first and a second fluid chamber whose volumes increase when the movable die plate is moved toward and away from the stationary die plate, respectively, by the mold closing cylinder. The clamping cylinder is connected to a hydraulic circuit, which permits a fluid to flow between the first and second chambers through a connecting line when the movable and stationary die plates are moved relative to each other by the closing and opening cylinder. The hydraulic circuit is adapted to apply a fluid pressure to the first fluid chamber to clamp the movable and stationary dies together after the movable die is brought into abutting contact with the stationary die by the closing and opening cylinder.

9 Claims, 6 Drawing Sheets

HYDRAULICALLY OPERATED CASTING MACHINE FOR PRODUCING A FORMED PRODUCT, HAVING MOLD CLOSING AND CLAMPING CYLINDERS

BACKGROUND OF THE INVENTION

1. Field of the Invention

The present invention relates generally to a machine having a mold consisting of a stationary die and a movable die which are clamped together to produce a formed product, and more particularly to an improved mold clamping device for clamping the mold.

2. Discussion of the Prior Art

As a machine for producing a formed product by molding, casting or pressing using a mold consisting of a stationary die and a movable die, there is widely known a forming machine of a mold-clamping type such as a casting machine for aluminum alloys, in which the stationary and movable dies are clamped together by a clamping force. This mold-clamping type of forming machine includes (a) a stationary die plate to which the stationary die is fixed, (b) a movable die plate which carries the movable die such that the movable die faces the stationary die, and (c) a clamping hydraulic cylinder for moving the movable die plate toward and away from the stationary die plate. In this forming machine, an operation to produce a formed product such as a casting, molding or pressing is effected while the mold is in the clamped state, namely while the stationary and movable dies are clamped together. An example of the known mold-clamping type forming machine is disclosed in JP-A-3-155445 (laid-open publication of unexamined Japanese Patent Application), and is illustrated in FIG. 9, wherein a plurality of tie rods or guide posts 3 are fixed to a stationary die plate 2 on which a stationary die 1 is fixedly disposed. The guide posts 3 extend upright from the stationary die plate 2, so that a movable die plate 5 which carries a movable die 4 is slidably guided by the guide posts 3 in the vertical direction. The movable die plate 5 is moved in the vertical direction by a mold closing and opening hydraulic cylinder 7 mounted on a bracket 6 which is attached to the upper ends of the guide posts 3. After the movable die 4 is brought into abutting contact with the stationary die 1 by the hydraulic cylinder 7, the movable die plate 5 is pressed toward the stationary die plate 2, also by the hydraulic cylinder 7, to force the movable die 4 against the stationary die 1, that is, to clamp the mold 1, 4.

In some operations of such mold-clamping type forming machines as described above, a relatively large clamping force must be applied to the mold. For instance, where a mold cavity defined by the stationary and movable dies in abutting contact with each other is filled with a molten metal for casting, pressurizing cylinders incorporated in the mold are activated to apply a high pressure to the mass of the molten metal in the mold cavity. In this case, the mold closing and opening hydraulic cylinder should have a sufficiently large pressure receiving area. This means that a comparatively large amount of a working fluid should be supplied to the hydraulic cylinder to move the movable die plate for closing and opening the mold, whereby the operating cycle time of the machines tends to be long, with a result of lowering the production efficiency. Although the cycle time can be shortened by using a hydraulic pump with a large delivery capacity for the mold closing and opening hydraulic cylinder, this leads to increased size and cost of the hydraulic system.

Another form of the mold-clamping type forming machine as indicated above is disclosed in laid-open Publication No. 64-10394 of unexamined Japanese Utility Model Application. This forming machine is a pressing machine which includes (a) a stationary die plate to which a stationary die is fixed, (b) a plurality of guide posts attached upright to outer portions of the stationary die outside the periphery of the stationary die, (c) a plurality of mold clamping hydraulic cylinders having respective pistons provided as integral parts of the respective guide posts, and respective cylinder housings which axially slidably engage the respective guide posts and pistons, and (d) a movable die plate which is fixed to the cylinder housings of the mold clamping hydraulic cylinders and which carries a movable die such that the movable die faces the stationary die. The movable die plate is forced toward the stationary die plate by the mold clamping hydraulic cylinders, so as to clamp the stationary and movable dies together when a formed product is produced. This pressing machine in which the guide posts are utilized as part of the mold clamping hydraulic cylinders is simpler and more compact in construction than a machine in which the mold clamping hydraulic cylinders is/are mounted on a bracket fixed to the upper ends of the guide posts.

In the pressing machine of the above type in which the cylinder housings of the mold clamping hydraulic cylinders are fixed to the movable die plate, the movable die plate tends to undergo buckling or bending deformation when the outer portions of the movable die plate outside the periphery of the movable die are forced toward the stationary die plate to clamp the mold. In this event, the attitude of the cylinder housings fixed to the buckled movable die plate is more or less changed, whereby the cylinder housings tend to exert a stress on the guide posts and the pistons, resulting in damaging the cylinder housings, guide posts and pistons, and an early local wear of the sliding components, leading to shorted life expectancy of the machine.

Where the forming machine of the mold-clamping type as shown in FIG. 9 is used for casting or molding, the single mold closing and opening hydraulic cylinder 7 forces a central portion of the movable die plate 5. This arrangement does not assure even distribution of the clamping force over the entire contacting surfaces of the movable and stationary dies 1, 4, which are outside the periphery of the mold cavity which is to be filled with a molten material such as a molten metal. Consequently, the clamped mold may have a local gap between the contacting surfaces of the two dies. In this event, the molten material tends to penetrate or leak through the gap, and the formed product may have burrs due to the penetration or leakage of the molten material. This problem is serious particularly on a casting machine in which a molten metal in the mold cavity is pressurized by suitable means.

While the forming machine disclosed in the above-identified publication No. 64-10394 uses hydraulic cylinders to force outer portions of the movable die plate toward the stationary die plate, this forming machine is a pressing machine adapted to form plates or other planar workpieces under pressure, and does not suffer from the above problem associated with the molten material in the mold cavity.

SUMMARY OF THE INVENTION

It is therefore a first object of the present invention to provide a forming machine wherein the mold can be opened and closed in a relatively short time and clamped with a sufficient force.

A second object of this invention is to provide a forming machine which is protected against damage and shortened life of mold clamping hydraulic cylinders and guide posts, due to buckling deformation of the movable die plate upon clamping of the mold.

A third object of the invention is to provide a forming machine such as a casting or molding machine, wherein the mold having a cavity to be filled with a molten material is clamped so as to avoid burrs left on a produced formed product, or leakage of the molten material from the cavity.

The first object indicated above may be achieved according to a first aspect of this invention, which provides a forming machine having a stationary die plate, a stationary die fixed to the stationary die plate, a movable die plate, a movable die carried by the movable die plate and facing the stationary die, and at least one mold closing and opening hydraulic cylinder for moving the movable die plate toward and away from the stationary die plate, the stationary and movable dies cooperating to produce a formed product when the stationary and movable dies are clamped together after the movable die is brought into abutting contact with the stationary die, the forming machine comprising: (a) at least one mold clamping hydraulic cylinder each having a cylinder housing and a piston which are moved relative to each other as the movable die plate is moved relative to the stationary die plate by the at least one mold closing and opening hydraulic cylinder, the cylinder housing and the piston cooperating to at least partially define a first fluid chamber whose volume increases when the movable die plate is moved toward the stationary die plate, and a second fluid chamber whose volume increases when the movable die plate is moved away from the stationary die plate; and (b) a mold clamping hydraulic circuit for permitting a working fluid to flow between the first and second fluid chambers when the movable and stationary die plates are moved relative to each other by the at least one mold closing and opening hydraulic cylinder, and for applying a pressure of the fluid to the first fluid chamber to clamp the movable and stationary dies together after the movable die is brought into abutting contact with the stationary die by the at least one mold closing and opening hydraulic cylinder.

In the forming apparatus constructed to the first aspect of the present invention as described above, the movable die plate is moved toward and away from the stationary die plate by the mold closing and opening hydraulic cylinder or cylinders, to close and open a mold which consists of the stationary and movable dies. The movements of the movable die plate to close and open the mold do not require a large drive force as required to clamp the mold, the pressure receiving surface area of the mold closing and opening cylinders can be made relatively small, and therefore the mold can be closed and opened in a relatively short time even when the delivery capacity or rating of a hydraulic pump for the mold closing and opening hydraulic cylinder or cylinders is relatively small. When the mold is closed or opened, the working fluid flows between the first and second fluid chambers of each mold clamping hydraulic cylinder, as the movable die plate is moved toward and away from the stationary die plate by the mold closing and opening hydraulic cylinder or cylinders.

After the movable die is brought into abutting contact with the stationary die with the movable die plate moved toward the stationary die plate by the mold closing and opening hydraulic cylinder or cylinders, the pressurized fluid is supplied to the first fluid chamber of the mold clamping hydraulic cylinder or cylinders, to clamp the movable and stationary dies together, that is, to firmly clamp the mold. To obtain a sufficient clamping force, each mold clamping hydraulic cylinder should have a comparatively large pressure receiving surface area. In this respect, it is noted that the first fluid chamber of the clamping hydraulic cylinder is already filled with the working fluid, and therefore only a small amount of flow of the fluid into the first fluid chamber is sufficient to clamp the mold. Accordingly, the mold can be firmly clamped in a short time even where the hydraulic pump to deliver the pressurized fluid to the mold clamping hydraulic cylinder or cylinders has a relatively small capacity. Thus, the present forming machine is adapted to close and open the mold in a relatively short time and clamp the mold with a sufficient force, even when the hydraulic pump for the mold closing and opening and mold clamping hydraulic cylinders has a comparatively small delivery capacity.

The second object indicated above may be achieved according to a second aspect of the present invention, which provides a forming machine having a stationary die plate, a stationary die fixed to the stationary die plate, a movable die plate, a movable die carried by the movable die plate and facing the stationary die, a plurality of guide posts fixed to outer portions of the stationary die plate outside an inner portion of the stationary die plate to which the stationary die is fixed, and a plurality of mold clamping hydraulic cylinders having respective pistons provided on the guide posts, respectively, the mold clamping hydraulic cylinders further having respective cylinder housings which are fixed to the movable die plate and axially slidably engage the guide posts and the pistons, the stationary and movable dies cooperating to produce a formed product when the stationary and movable dies are clamped together by the mold clamping hydraulic cylinders, the forming machine comprising a two-piece sliding member interposed between the movable die plate and the cylinder housing of each of the hydraulic cylinders. The two-piece sliding member consists of a first member and a second member which slidably contact each other and one of which has a part-spherical surface whose spherical center lies on a center line of the cylinder housing.

In the forming machine constructed according to the second aspect of this invention as described above, the two-piece sliding member or washer is interposed between the movable die plate and the cylinder housing of each mold clamping hydraulic cylinder. If the movable die plate is buckled or bent upon clamping of the mold, the first and second members of the two-piece sliding member are slidably displaced relative to each other via the part-spherical surface. This relative displacement prevents or minimizes a change in the attitude of the cylinder housings due to the buckling or bending deformation of the movable die plate, while avoiding a stress being exerted to the guide posts and pistons. Thus, the provision of the two-piece sliding member between each cylinder housing and the movable die plate is effective to protect the mold clamping hydraulic cylinders and the guide posts against damaging and local wearing due to buckling of the movable die plate, and thereby improve the life expectancy of the hydraulic cylinders and guide posts.

The third object indicated above may be achieved according to a third aspect of this invention, which provides a forming machine having a stationary die plate, a stationary die fixed to the stationary die plate, a movable die plate, a movable die carried by the movable die plate and facing the stationary die, and clamping means for forcing the movable die plate toward the stationary die plate to clamp the movable and stationary dies together, the movable and stationary dies cooperating to define a mold cavity which is to be filled with a molten material, to produce a formed product, wherein the clamping means comprises a plurality of mold clamping hydraulic cylinders disposed outside a periphery of the movable die, to force respective outer portions of the movable die plate which are outside an inner portion of the movable die plate to which the movable die is fixed.

In the forming machine constructed according to the third aspect of the present invention as described above, two or more mold clamping hydraulic cylinders are disposed outside the periphery of the movable die, to force the respective outer portions of the movable die plate which are outside the inner portion of the movable die plate to which the movable die is fixed. Therefore, the contacting surfaces of the stationary and movable dies, in particular, the areas of these contacting surfaces which are outside the periphery of the mold cavity are substantially evenly firmly pressed against each other, without a gap left therebetween due to buckling of the movable die plate. Accordingly, the mold clamping hydraulic cylinders disposed as described above are effective to avoid the penetration or leakage of the molten material into or through the above-indicated gap. Thus, the present forming machine assures a cast or molded product without burrs due to the penetration of the molten material in between the contacting surfaces of the stationary and movable dies.

BRIEF DESCRIPTION OF THE DRAWINGS

The above and optional objects, features and advantages of the present invention will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
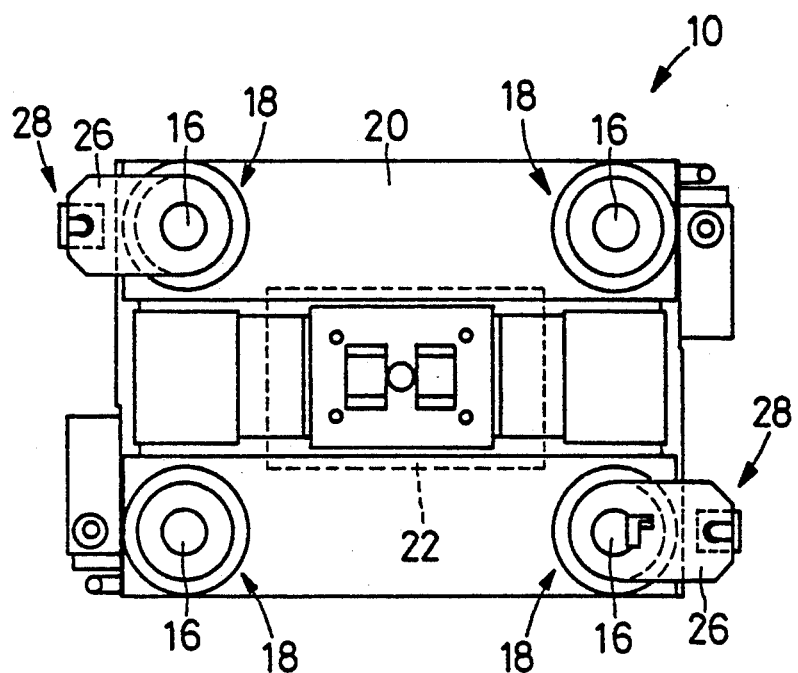
FIG. 1 is a plan view of one embodiment of a forming machine of the present invention, in the form of a casting or molding machine of a mold-clamping type.
Figure 2:
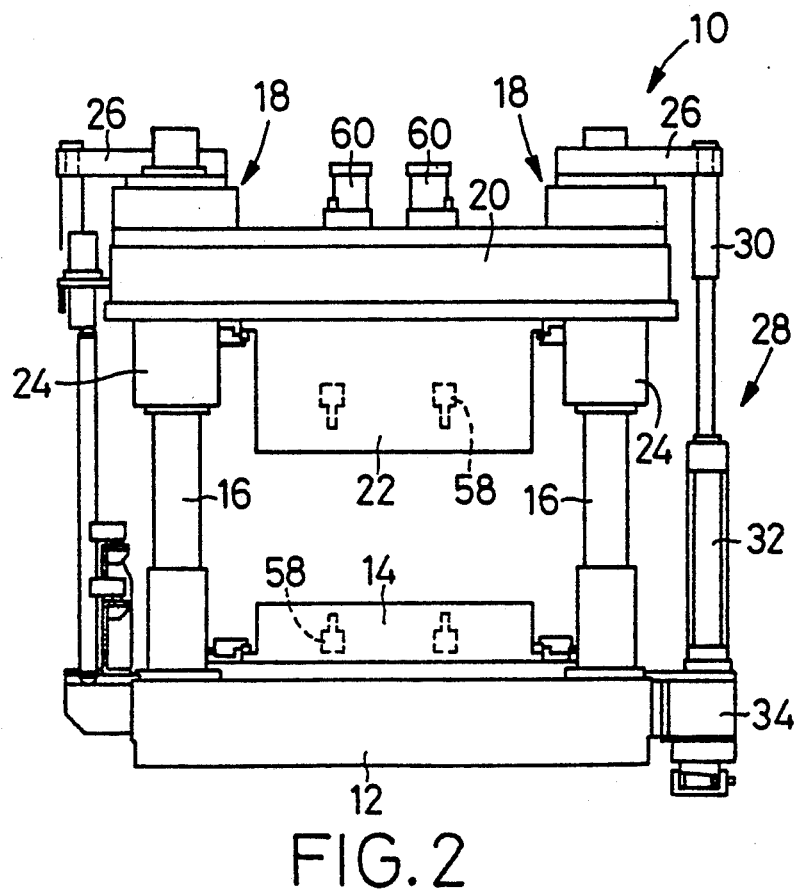
FIG. 2 is a front elevational view of the pressure casting machine of FIG. 1.

Referring first to FIGS. 1 and 2, the forming machine in the form of a casting or molding machine of a mold-clamping type is generally indicated at 10. The casting machine 10 has a stationary die plate in the form of a base 12 on which is fixed a stationary die 14. Four guide posts 16 extend upright in parallel with each other, from respective four portions of the base 12 which are outside the periphery of the stationary die 14.

Respective four mold clamping hydraulic cylinders 18 (hereinafter referred to as "clamping cylinders") are associated with the respective guide posts 16, and a movable die plate 20 is movably connected to the guide posts 16 via the clamping cylinders 18, such that the movable die plate 20 is substantially parallel with the base 12. The movable die plate 20 carries a movable die 22 fixed to its underside, such that the movable die 22 faces the stationary die 14 in the downward direction. The stationary and movable dies 14, 22 cooperate to form a casting mold of the machine.

The movable die plate 20 is connected to cylinder housings 24 of the clamping cylinders 18, and is movable with the cylinder housings 24, in the vertical direction while being guided by the guide posts 16. The cylinder housings 24 of the two clamping cylinders 18 at the upper left and lower right corners of the movable die plate 20 as seen in FIG. 1 are connected to respective piston rods 30 of mold closing and opening hydraulic cylinders 28 (hereinafter referred to as "closing and opening cylinders"), via respective connecting members 26, as shown in FIG. 2. The cylinders 28 have respective cylinder housings 32 which are secured to respective brackets 34 which extend from the sides of the base 12. The cylinder housings 32 extend upright in parallel with the guide posts 16, with a suitable spacing therebetween in the horizontal direction. The piston rods 30 axially slidably engage the cylinder housings 32, so that the movable die plate 20 is movable with the cylinder housings 24 of the clamping cylinders 18 in the vertical direction, with the pistons on the piston rods 30 being moved within the cylinder housings 32.

Figure 3:
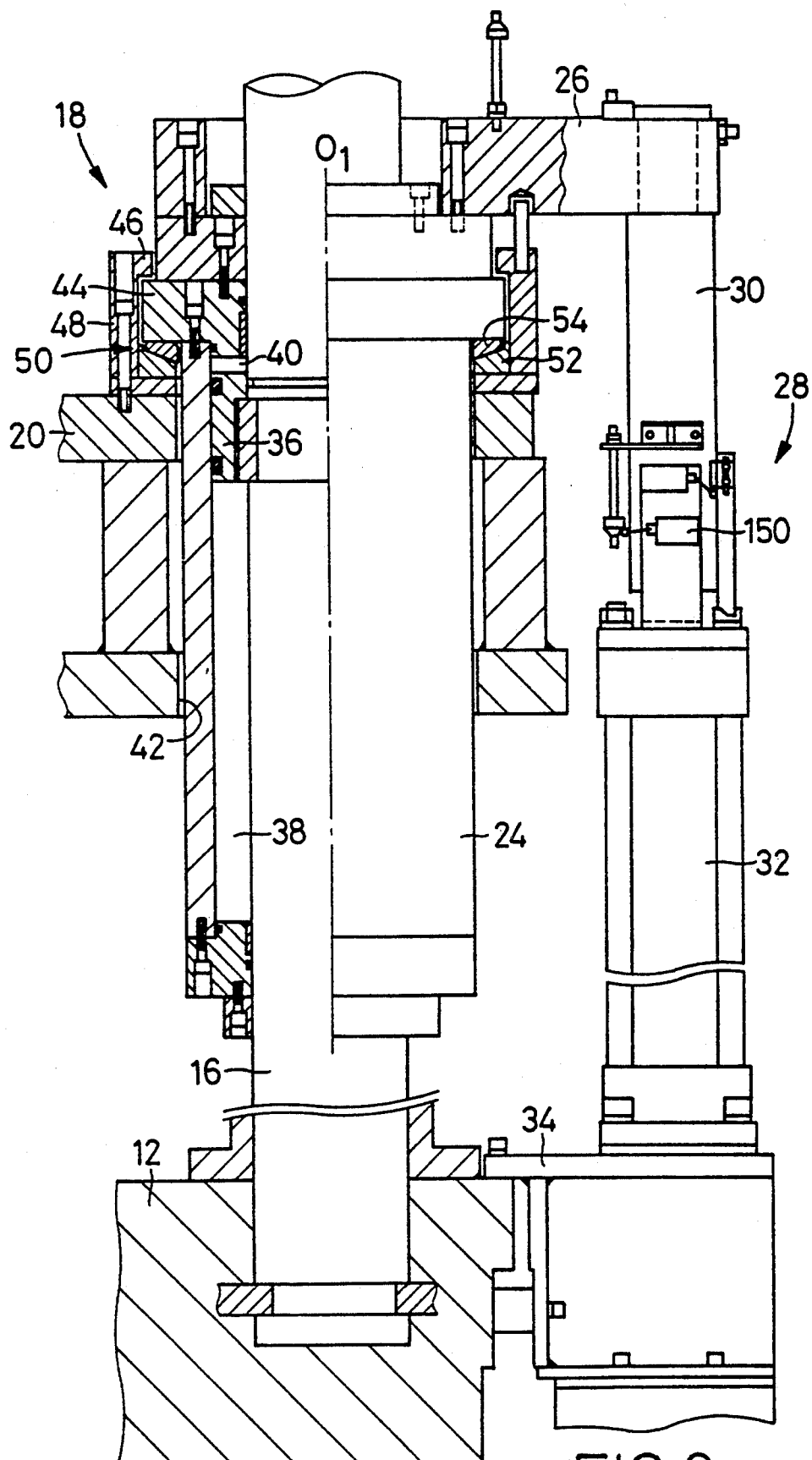
FIG. 3 is an elevational view in axial cross section of one of mold-clamping hydraulic cylinders used in the casting machine of FIG. 1.

Referring next to FIG. 3, the clamping cylinders 18 will be described in detail. Each guide post 16 is provided at an axially middle portion thereof with an integrally formed piston 36. The corresponding cylinder housing 24 axially slidably engages the guide post 16 and the piston 36. Sealing members are provided on the inner circumferential surface of the cylinder housing 24 which slidably contacts the guide post 16, and on the outer circumferential surface of the piston 36 which slidably contacts the cylinder housing 24. Further, an O-ring is provided between the guide post 16 and the piston 36. Thus, the cylinder housing 24, guide post 16 and piston 36 cooperate with each other to define two fluid-tight chambers, namely, a first fluid chamber 38 on the lower side of the piston 36, and a second fluid chamber 40 on the upper side of the piston 36. The clamping cylinder 18 is operated such that the volume of the first fluid chamber 38 is increased to lower the cylinder housing 24 or to move the movable die plate 20 toward the base 12, and such that the volume of the second fluid chamber 40 is increased to elevate the cylinder housing 24 or to move the movable die plate 20 away from the base 12. The pressure-receiving surface area and the thrust force of each clamping cylinder 18 are sufficiently larger than those of each mold closing and opening cylinder 28. To clamp the stationary and movable dies 14, 22, a hydraulic pressure is applied to the first fluid chamber 38 in the closed state of the mold of FIG. 3 in which the movable die plate 20 and cylinder housings 24 are placed in the lowermost position by the closing and opening cylinders 28. As a result, the two dies 14, 22 are clamped together with a sufficiently larger force (e.g., $4.9 \times 10^6 N$ or approximately 500t per each cylinder 18) than the force produced by the two cylinders 28.

The cylinder housing 24 of each clamping cylinder 18 extends through a through-hole 42 formed through the movable die plate 20, and is provided with a flange 44 fixed at its upper end. The flange 44 has a larger outside diameter than the diameter of the through-hole 42, and is located above the upper surface of the movable die plate 20. On the other hand, the movable die plate 20 has a mounting ring 48 secured to its upper surface. The mounting ring 48 has an inward flange 46 at its upper end, which has a smaller inside diameter than the outside diameter of the flange 44. The inward flange 46 of the mounting ring 48 loosely engages the flange 44 of the cylinder housing 24, as described below, whereby the cylinder housing 24 and the movable die plate 20 are connected to each other.

Between the lower surface of the flange 44 and the upper surface of the movable die plate 20, there is interposed a sliding member in the form of a two-piece washer 50 which includes of a lower ring 52 having a concave conical upper surface, and an upper ring 54 having a part-spherical surface whose spherical center lies on a center line O1 of the cylinder housing 24. In operation, the lower and upper rings 52, 54 slidably contact each other. Between the surface defining the through-hole 42 and the outer circumferential surface of the cylinder housing 24, there is provided a small clearance of about 5 mm in diameter. Further, the dimension between the upper surface of the two-piece washer 50 and the underside of the inward flange 46 of the mounting ring 48 is made slightly larger than the thickness of the flange 44, so as permit a relative displacement between the cylinder housing 24 and the movable die plate 20.

Figure 7:
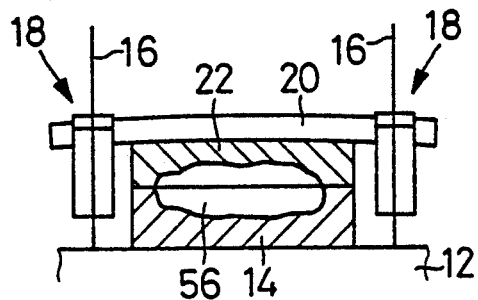
FIG. 7 is a schematic elevational view in cross section of the mold in the clamped state.

The stationary die 14 and the movable die 22 have respective recesses which define a mold cavity 56 as indicated in FIG. 7, when the movable die 22 is brought into abutting contact with the stationary die 14, that is, when the mold 14, 22 is closed with the movable die plate 20 placed in the lowermost position. The mold cavity 56 corresponds to a profile of an article to be produced by casting or molding. More specifically, a molten material such as a molten aluminum alloy is fed or forced into the mold cavity 56, from a suitable reservoir located below the base 12, by a suitable feed device such as a pump. With the cavity 56 in the closed mold 14, 22 filled with the molten metal, pressurizing cylinders 58 disposed in the dies 14, 22 are activated to apply a high pressure (for example, approx. $9 \times 10^7$ to $14.7 \times 10^7$ Pa, or approx. 500–1500 kgf/cm²) to the molten metal in the cavity 56. Usually, the mold cavity 56 is evacuated to approx. $13.3 \times 10^2$ Pa (approx. 10 torr) or lower, by a suitable evacuating device, prior to the filling of the cavity 56 with the molten metal. As well known in the art, the movable die 22 incorporates ejector or knock-pins which are activated by pneumatically operated ejector cylinders 60 provided on the movable die plate 20, to eject the casting from the mold 14, 22.

Figure 4:
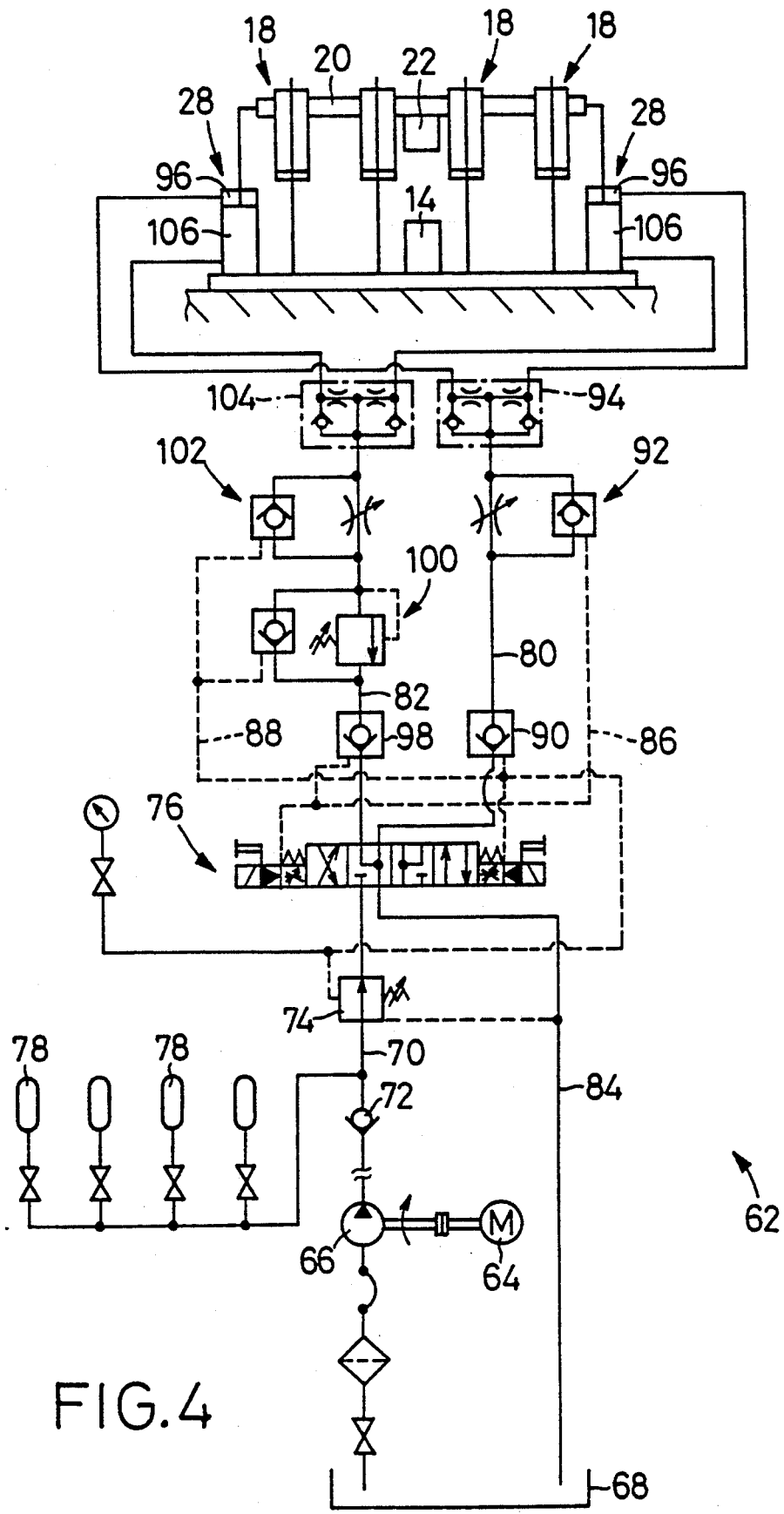
FIG. 4 is a diagram showing a hydraulic circuit for closing and opening a mold of the casting machine of FIG. 1.
Figure 5:
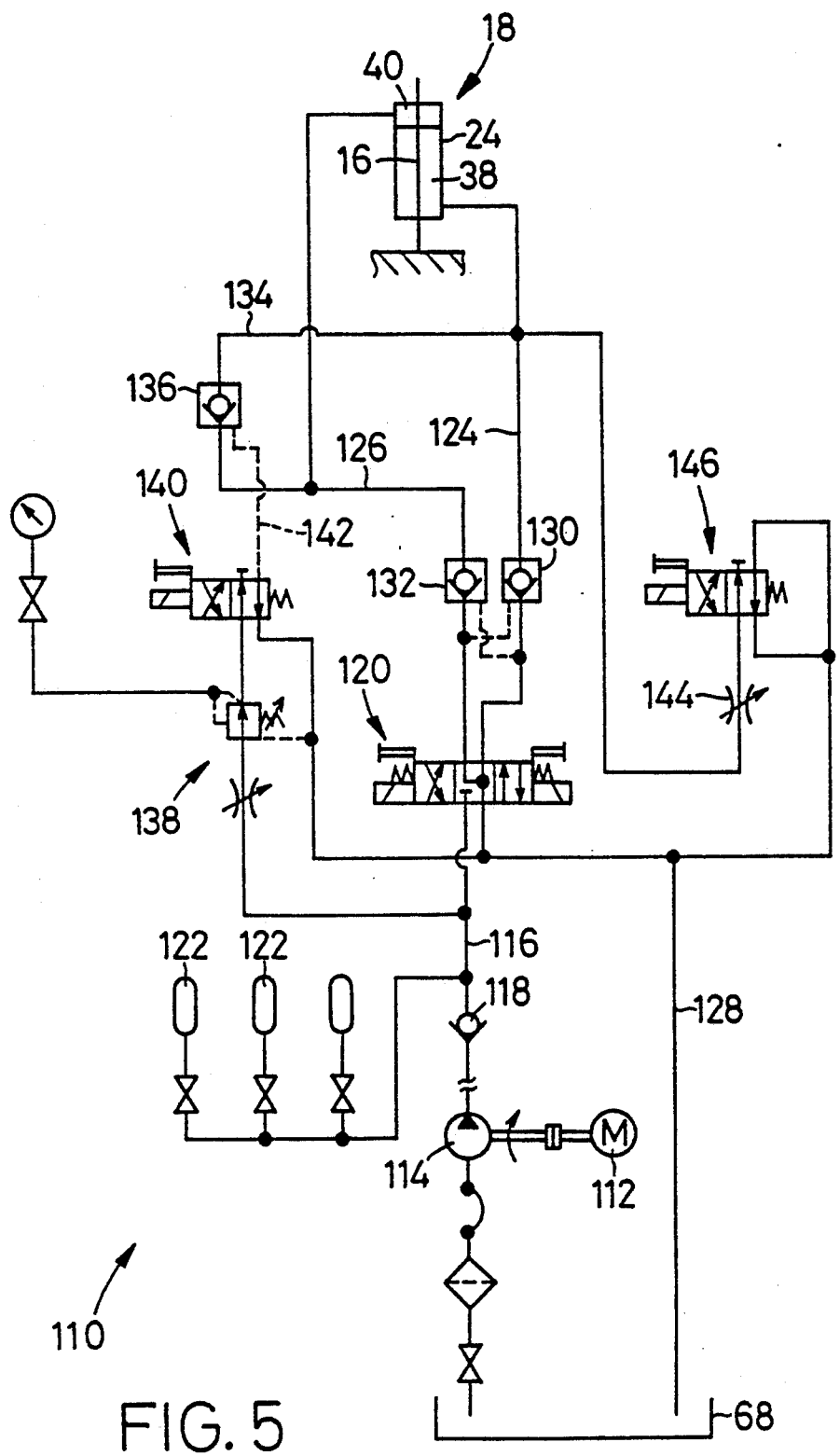
FIG. 5 is a diagram showing a hydraulic circuit for clamping and unclamping the mold of the casting machine of FIG. 1.

The mold-clamping type casing machine 10 has hydraulic circuits 62 and 110 as shown in FIGS. 4 and 5, for operating the mold closing and opening cylinders 28 and the mold clamping cylinders 18, respectively.

The hydraulic circuit 62 of FIG. 4 for the mold closing and opening cylinders 28 has a hydraulic power source in the form of a hydraulic pump 66 driven by an electric motor 64. A working fluid stored in a reservoir 68 is pressurized by the pump 66, and delivered into a supply line 70 through a pressure relief valve, etc. The supply line 70 has a check valve 72 and a pressure reducing valve 74, and is connected to a solenoid-operated 4-position pilot control valve 76. Between the check valve 72 and the pressure reducing valve 74, there are connected gas-charged accumulators 78. The 4-position pilot control valve 76 has: a first position for connecting the supply line 70 to a mold closing line 80 and connecting a mold-opening line 82 to a drain line 84; a second position for disconnecting the supply line 70 and connecting the mold-closing and mold-opening lines 80, 82 to the drain line 84; a third position for connecting the supply line 70 to the mold-closing and mold-opening lines 80, 82 and disconnecting the drain line 84; and a fourth position for connecting the supply line 70 to the mold-opening line 82 and connecting the mold-closing line 80 to the drain line 84. When the control valve 76 is placed in the first position, a pilot pressure is applied to a pilot line 86. When the control valve 76 is in the fourth position, a pilot pressure is applied to a pilot line 88.

The mold-closing line 80 has a pilot-operated check valve 90, a flow control valve 92 and a flow divider valve 94, and communicates with a mold-closing fluid chamber 96 of each of the first pair of mold closing and opening cylinders 28. On the other hand, the mold-opening line 82 has a pilot-operated check valve 98, a counterbalance valve 100, a flow control valve 102 and a flow divider valve 104, and communicates with a mold-opening fluid chamber 106 of each of the second pair of mold closing and opening cylinders 28. The pilot line 86 is connected to the check valve of the flow control valve 92 and to the check valve 98. These check valves 92, 98 are opened when the pilot pressure is applied to the pilot line 86, that is, when the pilot control valve 76 is operated to the first position. The pilot line 88 is connected to the counterbalance valve 100, check valve of the flow control valve 102 and check valve 90. These valve 100 and check valves 102, 90 are opened when the control valve 76 is operated to the fourth position to apply the pilot pressure to the pilot line 88.

The hydraulic circuit 110 of FIG. 5 for the mold clamping cylinders 18 has a hydraulic power source in the form of a hydraulic pump 114 driven by an electric motor 112. The working fluid stored in the reservoir 68 is pressurized by the pump 114, and delivered into a supply line 116 through a pressure relief valve, etc. The supply line 116 has a check valve 118, and is connected to a solenoid-operated 3-position control valve 120. Between the check valve 118 and the 3-position control valve 120, there are connected gas-charged accumulators 122. The 3-position control valve 120 has: a first position for connecting the supply line 116 to a mold-clamping line 124 and connecting a mold-unclamping line 126 to a drain line 128; a second position for disconnecting the supply line 116 and connecting the mold-clamping and mold-unclamping lines 124, 126 to the drain line 128; and a third position for connecting the supply line 116 to the mold-unclamping line 126 and connecting the mold-clamping line 124 to the drain line 128. The mold-clamping and mold-unclamping lines 124, 126 have respective pilot-operated check valves 130, 132. The mold-clamping line 124 communicates with the first fluid chamber 38 of each clamping cylinder 18, while the mold-unclamping line 126 communicates with the second fluid chamber 40 of each clamping cylinder 18. The check valve 130 is opened when the pressurized fluid is applied from the supply line 116 to the mold-unclamping line 126. The check valve 132 is opened when the pressurized fluid is applied from the supply line 116 to the mold-clamping line 124.

The mold-clamping and mold-unclamping lines 124, 126 are connected to each other by a connecting line 134, between respective check valves 130, 132 and the clamping cylinder 18. The connecting line 134 has a pilot-operated check valve 136, which always permits a flow of the fluid from the mold-unclamping line 126 to the mold-clamping line 124. The check valve 136 is opened permitting the fluid flows in the opposite directions, when the fluid is applied from the supply line 116 to a pilot line 142 through a flow control valve 138 and a solenoid-operated 2-position pilot control valve 140. The 2-position control valve 140 has a first position for connecting the supply line 116 to the pilot line 142, and a second position for connecting the pilot line 142 to the drain line 128. The control valve 140 is spring-biased toward the second position. Between the check valve 130 in the mold-clamping line 124 and the clamping cylinder 18, there is connected the drain line 128, through a flow restrictor 144 and a solenoid-operated 2-position control valve 146. The 2-position control valve 146 has a first position for connecting the mold-clamping line 124 to the drain line 128, and a second position for disconnecting these lines 124, 128 from each other. The control valve 146 is spring-biased toward the second position.

The hydraulic circuit including the control valves 120, 140, 146 and the other components described above by reference to FIG. 5 is provided for each of the four clamping cylinders 18, and the supply line 116 is branched, at a point downstream of the point of connection to the accumulators 122, for connection to the four hydraulic circuits for the four clamping cylinder 18.

The present mold-clamping type casting machine 10 is operated under the control of a sequence controller which is adapted to receive output signals of various detectors for detecting the operating conditions of the respective members of the machine. The detectors include a limit switch 150 as shown in FIG. 3, for detecting the closing of the mold 14, 22, upon lowering of the movable die plate 20. The sequence controller controls the solenoid-operated control valves 76, 120, 140, 146 in a predetermined sequence, according to the output signals of the detectors and according to a predetermined time schedule. The control valves 120, 140, 146 for the four clamping cylinders 18 are simultaneously operated.

Figure 6:
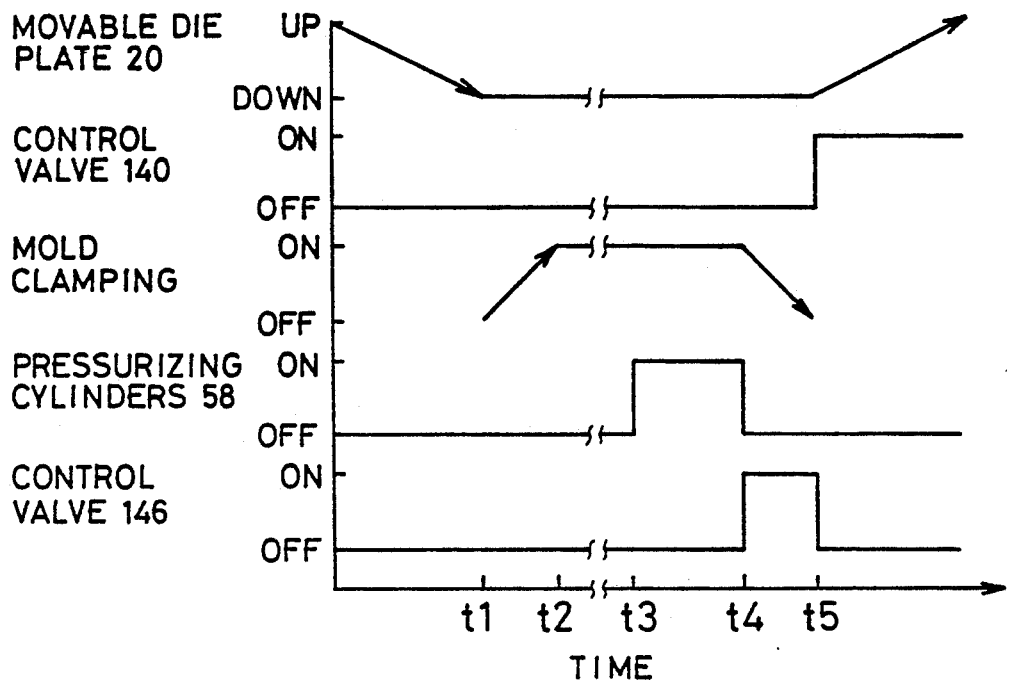
FIG. 6 is a graph indicating an operation of the casting machine of FIG. 1.

Referring to the time chart of FIG. 6, there will be described operations of the casting machine 10 to close and open the mold 14, 22 and to clamp and unclamp the mold. It is to be understood that the times or points of times t1-t5 indicated in the time chart of FIG. 6 are given for illustrative purpose only, and should not be interpreted to accurately represent the actual mold closing, opening, clamping and unclamping operations.

In the initial position of the present mold-clamping type casting machine, the movable die plate 20 is in the uppermost position, and the movable die 22 is spaced apart from the stationary die 14 in the vertical direction. In this condition, the 4-position pilot control valve 76 in the mold closing and opening hydraulic circuit 62 is operated to the first position, to connect the supply line 70 to the mold-closing line 80 and connect the mold-opening line 82 to the drain line 84. As a result, the check valve of the flow control valve 92 and the check valve 98 are opened by the pilot pressure applied to the pilot line 86, whereby the pressurized working fluid delivered from the hydraulic pump 66 is supplied from the supply line 70 substantially equally to the mold-closing chambers 96 of the two closing and opening cylinders 28, through the mold-closing line 80, while at the same time the working fluid discharged from the mold-opening chambers 106 is returned to the reservoir 68 through the mold-opening line 82 and the drain line 84. Consequently, the movable die plate 20 is lowered to the lowermost position in which the movable die 22 is in abutting contact with the stationary die 14. Thus, the mold 14, 22 is closed. While the movable die plate 20 is lowered to close the mold 14, 22, the 3-position and 2-position control valves 120, 140, 146 in the mold-clamping hydraulic circuit 110 are placed in their second position, in which the flows of the fluid from the fluid chambers 38, 40 of the clamping cylinders 18 to the drain line 128 are inhibited by the check valves 130, 132, but the flow of the fluid from the mold-unclamping line 126 to the mold-clamping line 124 is permitted through the connecting line 134 and the check valve 136. Therefore, the fluid which is forced out of the second fluid chambers 40 of the clamping cylinders 18 due to the lowering of the cylinder housings 24 with the movable die plate 20 is permitted to flow into the first fluid chambers 38 through the connecting line 134. In the time chart of FIG. 6, t1 represents a point of time at which the mold 14, 22 is closed by the downward movement of the movable die plate 20.

Upon detection of the closing of the mold 14, 22 by the limit switch 150, the 3-position control valve 120 in the mold-clamping hydraulic circuit 110 is switched to the first position to connect the supply line 116 to the mold-clamping line 124 and connect the mold-unclamping line 126 to the drain line 128. As a result, the pressurized fluid delivered from the hydraulic pump 114 is supplied from the supply line 116 to the first chambers 38 of the clamping cylinders 18, through the mold-clamping line 124, whereby the movable die 22 is firmly forced against the stationary die 14, via the movable die plate 20 fixed to the cylinder housings 24. Thus, the mold 14, 22 is clamped. Since the mold 14, 22 has been closed prior to its clamping, only a small amount of flow of the fluid into the first fluid chamber 38 of each clamping cylinder 18 is sufficient to clamp the mold 14, 22, while the fluid forced out of the second fluid chamber 40 is returned to the reservoir 68 through the drain line 128, via the check valve 132 which is opened by the pressure in the mold-clamping line 124. In FIG. 6, t2 represents a point of time at which the mold 14, 22 has been clamped together by the clamping cylinders 18.

In the clamped state of the mold 14, 22, the mold cavity 56 is evacuated, and a molten metal is injected into the cavity 56 through a suitable feed passage. With the feed passage closed, the pressurizing cylinders 58 are operated to pressurize the molten metal in the cavity 56. The cylinders 58 are held in the operated state for a time period t3–t4 as indicated in FIG. 6. During this time period, the molten metal in the cavity 56 is solidified into a casting whose profile is defined by the cavity 56.

When the pressurizing cylinders 58 are restored to the non-operated position, the 3-position control valve 120 in the mold clamping hydraulic circuit 110 is returned to the second position, while the 2-position control valve 146 in the same circuit 110 is switched to the first position, whereby the first chambers 38 are brought into communication with the drain line 128 through the mold-clamping line 124, the flow restrictor 144 and the 2-position control valve 146. As a result, the fluid pressure within the first chambers 38 is released, so that the clamped state of the mold 14, 22 is released. In FIG. 6, t5 represents a point of time at which the mold 14, 22 has been unclamped.

Then, the 2-position control valve 146 is returned to the second position to disconnect the mold-clamping line 124 and the drain line 128 from each other, while the 2-position control valve 140 is switched to the first position to apply the pilot pressure to the pilot line 142, for opening the check valve 136 and thereby permitting the fluid flow from the mold-clamping line 124 to the mold-unclamping line 126. Then, the 4-position control valve 76 in the mold opening and closing hydraulic circuit 62 is operated to the fourth position, to connect the supply line 70 to the mold-opening line 82 and connect the mold-closing line 80 to the drain line 84, whereby the counterbalance valve 100, the check valve of the flow control valve 102 and the check valve 90 are opened by the pilot pressure applied to the pilot line 88. As a result, the fluid from the pump 66 is supplied from the supply line substantially equally to the mold-opening chambers 106 of the two closing and opening cylinders 28 through the mold-opening line 82, while at the same time the fluid forced out of the mold-closing chambers 96 is returned to the reservoir 68 through the mold-closing line 80 and the drain line 84. Thus, the movable die plate 20 is elevated to move the movable die 22 from the stationary die 14, whereby the mold 14, 22 is opened. At this time, the cylinder housings 24 of the clamping cylinders 18 are moved up with the movable die plate 20, and the fluid forced out of the first fluid chambers 38 is permitted to flow into the second fluid chambers 40 through the connecting line 134 and the check valve 136, since the 2-position control valve 140 in the mold clamping hydraulic circuit 110 has been switched to the first position which permits the fluid flow from the mold-clamping line 124 to the mold-unclamping line 126. During this upward movement of the movable die 22 away from the stationary die 14, the pneumatic cylinders 60 are activated so that the ejector pins disposed in the movable die 22 are pushed to eject the casing off the movable die 22.

As described above, the present casting machine 10 is provided with the mold closing and opening hydraulic cylinders 28 and the mold clamping hydraulic cylinders 18, so that the mold 14, 22 is closed and opened by the hydraulic cylinders 28, and is clamped and unclamped by the hydraulic cylinders 18. Since the movements of the movable die plate 20 to close and open the mold 14, 22 do not require a large drive force as required to clamp the mold 14, 22, the closing and opening cylinders 28 may be designed to have a relatively small pressure receiving surface area, and the mold 14, 22 can be closed and opened in a sufficiently short time even if the delivery capacity of the hydraulic pump 66 is relatively small. On the other hand, the clamping cylinders 18 to clamp the mold 14, 22 should have a comparatively large pressure receiving surface area so as to assure a large clamping force which can withstand the pressure of the molten metal raised by the pressurizing cylinders 58. In this respect, it is noted that the fluid forced out of the second fluid chamber 40 of each clamping cylinder 18 is fed into the first fluid chamber 38 as the movable die plate 20 is lowered to close the mold 14, 22. To clamp the mold 14, 22, therefore only a small amount of flow of the fluid into the first fluid chamber 38 is sufficient. Accordingly, the mold 14, 22 can be firmly clamped in a short time even if the delivery capacity of the hydraulic pump 114 is relatively small. Thus, the hydraulic unit including the pumps 66, 114 can be made compact, while permitting the casting machine 10 to perform a casting operation in a short cycle time, with a sufficient clamping force of the mold 14, 22.

Figure 9:
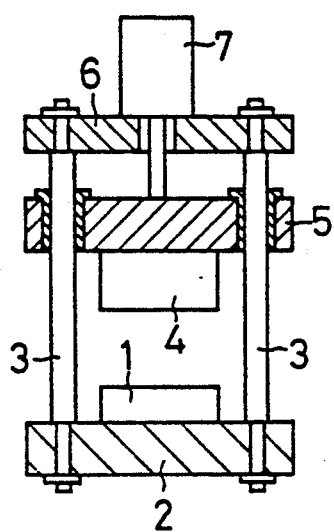
FIG. 9 is a schematic elevational view in cross section of a known mold-clamping type casting machine.

Further, the present casting machine 10 does not suffer from burrs on the casting produced, due to penetration of the molten metal in between the contacting surfaces of the stationary and movable dies 14, 22, or leakage of the molten metal through a gap between the contacting surfaces. Described more specifically, the four clamping cylinders 18 are provided so as to be located around the periphery of the movable die 22, so that the movable die plate 20 is pressed downward toward the base 12, at its four corner portions which are outside and spaced apart from the periphery of the movable die 22, as most clearly indicated in FIG. 1. Hence, the contacting surfaces of the stationary and movable dies 14, 22, in particular, the areas of these contacting surfaces which are outside the periphery of the mold cavity 56 are substantially evenly firmly pressed against each other, without a gap left therebetween due to buckling or bending of the movable die plate 20. Accordingly, the four clamping cylinders 18 are effective to avoid the above-indicated penetration or leakage of the molten metal even when the molten mass is pressurized by the pressurizing cylinders 58. Moreover, the clamping cylinders 18 provided on the guide posts 16 allow for simpler construction of the casting machine 10, than the known arrangement of FIG. 9 in which a clamping cylinder is disposed on a bracket fixed to the ends of the guide posts, to move the movable die plate.

When a relatively high pressure is applied to the molten metal in the mold cavity 56 after the mold 14, 22 is firmly clamped with the movable die plate 20 pressed toward the base 12 by the clamping cylinders 18, the movable die plate 20 tends to be convexedly buckled or warped as indicated in FIG. 7, particularly, at its peripheral portions at which the clamping cylinders 18 are provided. If the movable die plate 20 and the cylinder housings 24 of the clamping cylinders 18 were rigidly connected to each other, buckling or bending deformation of the movable die plate 20 would cause a change in the attitude of the cylinder housings 24, which results in a stress being exerted on the vertically extending guide posts 16 and the pistons 36 on the posts 16, and a consequent risk of damaging the clamping cylinders 18 and/or an early local wear of the slidably engaging components.

Figure 8:
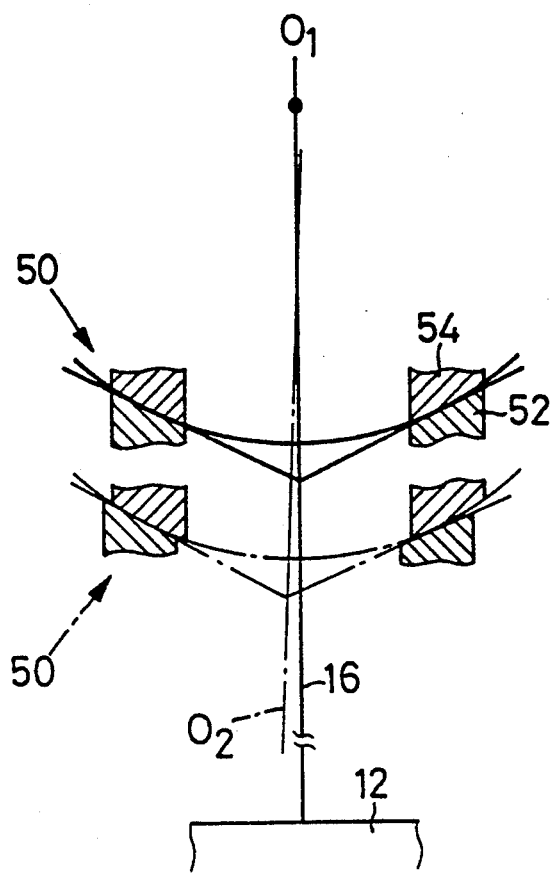
FIG. 8 is a view explaining an operation of a two-piece washer used in the casting machine of FIG. 1.

In the light of the above drawback, the present casting machine 10 employs the two-piece washers 50 between the cylinder housings 24 and the movable die plate 20, so as to allow a slight amount of relative displacement of the cylinder housings 24 and the movable die plate 20. Namely, relative sliding movements of the lower and upper rings 52, 54 of the two-piece washers 50 prevent the corresponding cylinder housings 24 from changing their attitude relative to the guide posts 16, even when the movable die plate 20 undergoes buckling or bending deformation upon activation of the pressurizing cylinders 58, whereby the guide posts 16 and the pistons 36 are protected from a stress which would otherwise occur upon the buckling deformation of the movable die plate 20. Described more particularly by reference to FIG. 8, the lower and upper rings 52, 54 of the two-piece washers 50 are substantially concentric or coaxial with each other as indicated by solid lines in FIG. 8, when the mold 14, 22 is closed by the closing and opening cylinders 28. When the cylinder housings 24 are forced down by the clamping cylinders 18, and the movable die plate 20 is buckled with its peripheral portions displaced downward, the lower ring 52 on the side of the movable die plate 20 is displaced such that a center line 02 of the lower ring 52 is inclined with respect to the center line of the guide posts 16, as indicated by one-dot chain lines in FIG. 8. At this time, however, the part-spherical lower surface of the upper ring 54 on the side of the cylinder housings 24 slides on the upper surface of the lower ring 52, so that the cylinder housings 24 are kept coaxial with the guide posts 16. Therefore, the cylinder housings 24 can be moved exactly in the vertical direction, along the center line of the guide posts 16 whose attitude is also kept in the vertical direction. Thus, the present arrangement allows the outer portion of the movable die plate 20 to flat with respect to the guide posts 16, cylinder housings 24 and pistons 36, and is effective to avoid a change in the attitude of the cylinder housings 24 due to the buckling or bending deformation of the movable die plate 20, that is, effective to prevent a damage of the clamping cylinders 18 and a local wear of the slidably engaging components associated with the clamping cylinders 18, whereby the life expectancy of the components is prolonged. As described above, there is provided a clearance between the cylinder housings 24 and the through-holes 42 formed through the movable die plate 20, for the purpose of permitting the relative displacement between the cylinder housings 24 and the movable die plate 20.

While the present invention has been described in detail in its presently preferred embodiment, it is to be understood that the invention may be otherwise embodied.

Although the casting machine 10 of mold-clamping type has been described as one embodiment of the present invention, the constructional features of the machine 10 are applicable to a casting machine without the pressurizing cylinders 58, and to molding machines such as injection molding machines, and various press-forming machines such as bending and drawing machines.

While the illustrated casting machine 10 has the four mold clamping cylinders 18 and the two mold closing and opening cylinders 28, the numbers, positions and size of these cylinders 18, 28 may be changed as needed.

In the illustrated embodiment, the hydraulic circuits 110, 62 having the respective hydraulic pumps 114, 66 are provided for the cylinders 18 and the cylinders 28, respectively, the two pumps 114, 66 may be replaced by a single pump, and other modifications may be made in respect of the hydraulic circuit arrangement for the cylinders 18, 28.

The two-piece washer 50 interposed between each cylinder housing 24 and the movable die plate 20 in the illustrated embodiment includes the upper ring 54 whose lower surface is part-spherical. However, the lower and upper rings 52, 54 may be reversed in position. That is, the lower ring may have a part-spherical upper surface. Further, the upper surface of the lower ring 52 is not limited to a concave conical configuration, and may be slightly convex at a radially middle portion thereof. The two-piece washer 50 may be constituted by two portions of the movable die plate 20 and the corresponding cylinder housing 24, one of which has a part-spherical surface whose spherical center lies on the center line O1 of the cylinder housing 24. In essence, the two-piece washer 50 may consist of first and second members having suitable opposing non-horizontal contact surfaces which slidably contact each other and allow the outer portion of the movable die plate 20 to float with respect to the mold clamping cylinders 18 and the guide posts 16.

It is to be understood that the present invention may be embodied with various other changes, modifications and improvements, which may occur to those skilled in the art, in the light of the foregoing teaches, without departing from the spirit and scope of the invention defined in the following claims.

What is claimed is:

1. In a casting machine having a stationary die plate, a stationary die fixed to the stationary die plate, a movable die plate, a movable die carried by the movable die plate and facing the stationary die, a plurality of guide posts fixed to outer portions of said stationary die plate outside an inner portion of said stationary die plate to which said stationary die is fixed, and a plurality of mold clamping hydraulic cylinders having respective pistons provided on said guide posts, respectively, said mold clamping hydraulic cylinders further having respective cylinder housings which are fixed to outer portions of said movable die plate and axially slidably engage said guide posts and said pistons, said stationary and movable dies cooperating to produce a formed product when the stationary and movable dies are clamped together by said mold clamping hydraulic cylinders, said forming machine comprising:

two-piece sliding members interposed between said movable die plate and said cylinder housings of said hydraulic cylinders, respectively, each of said two-piece sliding members including a first member and a second member having opposing non-horizontal contact surfaces which slidably contact each other, said two-piece sliding members allowing said outer portions of said movable die plate to float with respect to said cylinder housings, said pistons of said hydraulic cylinders, and said guide posts.

2. In a casting machine according to claim 1, wherein said first and second members comprise lower and upper rings fixed respectively to said outer portions of said movable die plate and said cylinder housings, one of said non-horizontal contact surfaces including a part-spherical surface on one of said lower and upper rings, each said part-spherical surface having a spherical center lying on a center line of one of said cylinder housings.

3. In a casting machine according to claim 2, wherein the other of said non-horizontal contact surfaces includes a substantially conical surface on the other of said lower and upper rings.

4. In a casting machine according to claim 1, wherein said movable die plate has through-holes through which said guide posts and said cylinder housings of said mold clamping hydraulic cylinders extend, such that there exists a predetermined clearance between a surface defining each of said through-holes and an outer circumferential surface of a corresponding one of said cylinder housings, said clearance permitting said movable die plate to be buckled without exerting a stress on said corresponding one cylinder housing.

5. In a casting machine according to claim 1, further comprising at least one mold closing and opening hydraulic cylinder for moving said movable die plate toward and away from said stationary die plate, said movable die being brought into abutting contact with said stationary die by said at least one mold closing and opening hydraulic cylinder before said stationary and movable dies are clamped together by said plurality of mold clamping hydraulic cylinders.

6. In a casting machine according to claim 5, wherein cylinder housing and said piston of each of said mold clamping hydraulic cylinders are moved relative to each other as said movable die plate is moved relative to said stationary die plate by said at least one mold closing and opening hydraulic cylinder, said cylinder housing, said piston and said guide post cooperating to define a first fluid chamber whose volume increases when said movable die plate is moved toward said stationary die plate, and a second fluid chamber whose volume increases when said movable die plate is moved away from said stationary die plate, said forming machine further comprising a mold clamping hydraulic circuit for permitting a working fluid to flow between said first and second fluid chambers when said movable and stationary die plates are moved relative to each other by said at least one mold closing and opening hydraulic cylinder, and for applying a pressure of the fluid to said first fluid chamber to clamp said movable and stationary dies together after said movable die is brought into abutting contact with said stationary die by said at least one mold closing and opening hydraulic cylinder.

7. In a casting machine according to claim 6, wherein said stationary and movable dies cooperate to define a mold cavity when said movable die is brought into abutting contact with said stationary die by said at least one mold closing and opening hydraulic cylinder, said mold cavity being filled with a molten material after said stationary and movable dies are clamped together by said plurality of mold clamping hydraulic cylinders, said formed product consisting of a casting obtained after solidification of said molten material.

8. In a casting machine according to claim 1, wherein said mold clamping hydraulic circuit having a connecting line which connects a first and second fluid chambers so as to permit a flow of a working fluid from a second fluid chamber into a first fluid chamber when said movable die plate is moved toward said stationary die plate.

9. In a casting machine according to claim 1, further comprising a mold clamping hydraulic circuit including a supply line for supplying a pressurized fluid having a pressure, a mold-clamping line connected to a first fluid chamber, a mold-unclamping line connected to a second fluid chamber, a drain line for draining said pressurized fluid, and a control valve which has a mold-clamping position for connecting said supply line to said mold-clamping line and connecting said mold-unclamping line to said drain line, and a mold-unclamping position for connecting said supply line to said mold-unclamping line and connecting said mold-clamping line to said drain line.

* * * * *

UNITED STATES PATENT AND TRADEMARK OFFICE
CERTIFICATE OF CORRECTION

PATENT NO. : 5,325,908
DATED : July 5, 1994
INVENTOR(S) : Sakae Sugishimi

It is certified that error appears in the above-indentified patent and that said Letters Patent is hereby corrected as shown below:

Claim 8, column 16, line 17, "wherein" should be --further comprising a--; and
    line 18, delete "said".

Signed and Sealed this

First Day of November, 1994

Attest:

BRUCE LEHMAN

Attesting Officer     Commissioner of Patents and Trademarks